(12) United States Patent
Fernandez Ciurleo et al.

(10) Patent No.: US 9,423,772 B2
(45) Date of Patent: Aug. 23, 2016

(54) CERAMIC ELEMENT INLAID WITH AT LEAST ONE COMPOSITE CERAMIC DECORATION

(71) Applicant: The Swatch Group Research and Development Ltd., Marin (CH)

(72) Inventors: Maria Fernandez Ciurleo, Fleurier (CH); Juliette Muller, La Neuveville (CH); Stewes Bourban, Chabrey (CH)

(73) Assignee: The Swatch Group Research and Development Ltd., Marin (CH)

( * ) Notice: Subject to any disclaimer, the term of this patent is extended or adjusted under 35 U.S.C. 154(b) by 0 days.

(21) Appl. No.: 14/400,369

(22) PCT Filed: Apr. 25, 2013

(86) PCT No.: PCT/EP2013/058661
§ 371 (c)(1),
(2) Date: Nov. 11, 2014

(87) PCT Pub. No.: WO2013/178412
PCT Pub. Date: Dec. 5, 2013

(65) Prior Publication Data
US 2015/0122774 A1    May 7, 2015

(30) Foreign Application Priority Data
May 30, 2012   (EP) .................................... 12170045

(51) Int. Cl.
*G04B 37/22* (2006.01)
*C04B 41/89* (2006.01)
(Continued)

(52) U.S. Cl.
CPC ............... *G04B 37/22* (2013.01); *A44C 25/00* (2013.01); *B23K 26/364* (2015.10);
(Continued)

(58) Field of Classification Search
CPC ........ G04B 37/22; G04B 3/41; G04B 19/12; G04B 19/28; G04B 37/225; G04B 39/00; G04B 45/0076; B23K 26/364; B23K 26/367; C04B 41/009; C04B 41/4576; C04B 41/52; C04B 41/80; C04B 41/89
See application file for complete search history.

(56) References Cited

U.S. PATENT DOCUMENTS

| | | | |
|---|---|---|---|
| 2009/0104409 A1* | 4/2009 | Derriey ................... | C03C 17/04 428/172 |
| 2011/0103199 A1* | 5/2011 | Winkler ................... | B21J 1/006 368/285 |
| 2011/0259753 A1 | 10/2011 | Grossenbacher et al. | |

FOREIGN PATENT DOCUMENTS

| | | |
|---|---|---|
| EP | 2 380 864 A1 | 10/2011 |
| JP | 2003-137677 | 5/2003 |
| WO | 2005/028399 A1 | 3/2005 |

OTHER PUBLICATIONS

Machine translation of JP2003-137677.*

(Continued)

*Primary Examiner* — Duy Deo
(74) *Attorney, Agent, or Firm* — Oblon, McClelland, Maier & Neustadt, L.L.P.

(57) ABSTRACT

A method of manufacturing an inlaid ceramic element for a timepiece including: a) forming a ceramic or cermet body; b) etching at least one recess in one face of the ceramic or cermet body, each at least one recess forming a pattern cavity for a decoration; c) changing a surface state of a bottom of the at least one recess to increase contact surface thereof; d) filling the at least one recess with a composite ceramic to form the decoration; e) flattening the composite ceramic so that the composite ceramic remains only in a hollow of the at least one recess.

20 Claims, 3 Drawing Sheets

(51) Int. Cl.
    *C04B 41/00*     (2006.01)
    *C04B 41/45*     (2006.01)
    *C04B 41/52*     (2006.01)
    *C04B 41/80*     (2006.01)
    *G04B 3/04*     (2006.01)
    *G04B 19/12*     (2006.01)
    *G04B 19/28*     (2006.01)
    *G04B 39/00*     (2006.01)
    *G04B 45/00*     (2006.01)
    *A44C 25/00*     (2006.01)

(52) U.S. Cl.
    CPC ........ *C04B 41/009* (2013.01); *C04B 41/4576* (2013.01); *C04B 41/52* (2013.01); *C04B 41/80* (2013.01); *C04B 41/89* (2013.01); *G04B 3/041* (2013.01); *G04B 19/12* (2013.01); *G04B 19/28* (2013.01); *G04B 37/225* (2013.01); *G04B 39/00* (2013.01); *G04B 45/0076* (2013.01)

(56) References Cited

OTHER PUBLICATIONS

International Search Report issued Jul. 5, 2013, in PCT/EP2013/058661, filed Apr. 25, 2013.

\* cited by examiner

CERAMIC ELEMENT INLAID WITH AT LEAST ONE COMPOSITE CERAMIC DECORATION

FIELD OF THE INVENTION

The invention relates to a ceramic element inlaid with at least one composite ceramic decoration and more specifically an element of this type intended to be mounted in a timepiece.

BACKGROUND OF THE INVENTION

It is known to form watch bezels at least partially made of synthetic sapphire in order to show, by means of transparency, a deposition in a recess underneath the bezel, for example, forming a scale or a brand name. This configuration has the advantage of protecting the deposition from any mechanical degradation by totally covering it with the sapphire part. However, this configuration may make the decoration difficult to read due to impaired transmission of the colour of the deposition but also due to the lack of colour difference between sapphire and the deposition.

SUMMARY OF THE INVENTION

It is an object of the present invention to overcome all or part of the aforementioned drawbacks, while maintaining the advantage of mechanical resistance and adding the advantage of improved visual quality.

To this end, the invention relates to a method of manufacturing an inlaid ceramic element for a timepiece including the following steps:
  a) forming a ceramic body;
  b) etching at least one recess in one face of the ceramic body, each at least one recess forming the pattern cavity for a decoration;
  c) changing the surface state of the bottom of said at least one recess in order to increase the contact surface thereof;
  d) filling said at least one recess with a composite ceramic so as to form said decoration;
  e) flattening out said composite ceramic so that it remains only in the hollow of said at least one recess.

It is immediately clear that the variety of shades of the decoration and/or the ceramic is no longer limited by the transparency of the latter and yet good wear resistance is still ensured. By way of example, it is therefore possible to obtain a highly contrasted visual rendering with a dark-coloured ceramic body and composite ceramic decorations in one (or more) light colour(s), while still having a "ceramic" appearance.

In accordance with other advantageous features of the invention:
  step a) is achieved by sintering;
  the ceramic body includes a carbide, an oxide or a nitride of materials such as titanium, silicon, aluminium or zirconium or a cermet;
  step b) is performed by laser;
  each at least one recess has a depth comprised between 80 μm and 500 μm to improve the force of adherence;
  step c) is performed by laser, sandblasting or chemical etching;
  when step c) is performed by laser, it is possible to form cavities in said bottom of said at least one recess;
  the cavities form grooves running on said bottom of said at least one recess;
  said grooves running on said bottom of said at least one recess are secant;
  the cavities have depths which are less than one fifth of the depth of said at least one recess;
  step d) includes phase i): filling said at least one recess with an organic matrix comprising ceramic particles and phase ii): crosslinking and densifying said matrix under a controlled atmosphere so as to form the composite ceramic;
  the organic matrix is formed from a modified or unmodified epoxy resin and/or a modified or unmodified acrylic and/or a polyurethane and/or a silicone;
  the ceramic particles are formed from a carbide, an oxide or a nitride of materials such as titanium, silicon, aluminium or zirconium;
  phase ii) is performed at a temperature of between 20 and 300° C. and/or at a pressure of between 1 and 6 bars;
  prior to step d), the method includes step f): forming a bonding layer on the bottom of said at least one recess in order to ensure improved adherence of the composite ceramic;
  the bonding layer is formed from a lacquer, a metal, a metallic alloy, a metallic nitride, a metallic carbide, a silane, an organosiloxane, an alkanethiol, an alkane disulfide, a zirconate, a titanate and/or an aluminate;
  between step d) and step e), the method includes: step b'): etching at least a second recess in one face of the composite ceramic, step c'): modifying the surface state of the bottom of said at least one second recess so as to increase its surface contact and step d'): filling said at least one second recess with a second composite ceramic formed of an organic matrix comprising ceramic particles so as to form said decoration with two composite ceramics.

Moreover, the invention relates to a portion of the exterior parts of a timepiece, to a portion of the timepiece movement or, more generally, to a timepiece, characterized in that it includes at least one ceramic element inlaid with a decoration formed by at least one composite ceramic according to any of the preceding variants.

Advantageously, it is therefore understood that the ceramic element can, in particular, form either all or part of a case, bracelet, bezel, dial, crystal, push button, crown, bridge, plate and/or oscillating weight of a watch.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

Figure 1:
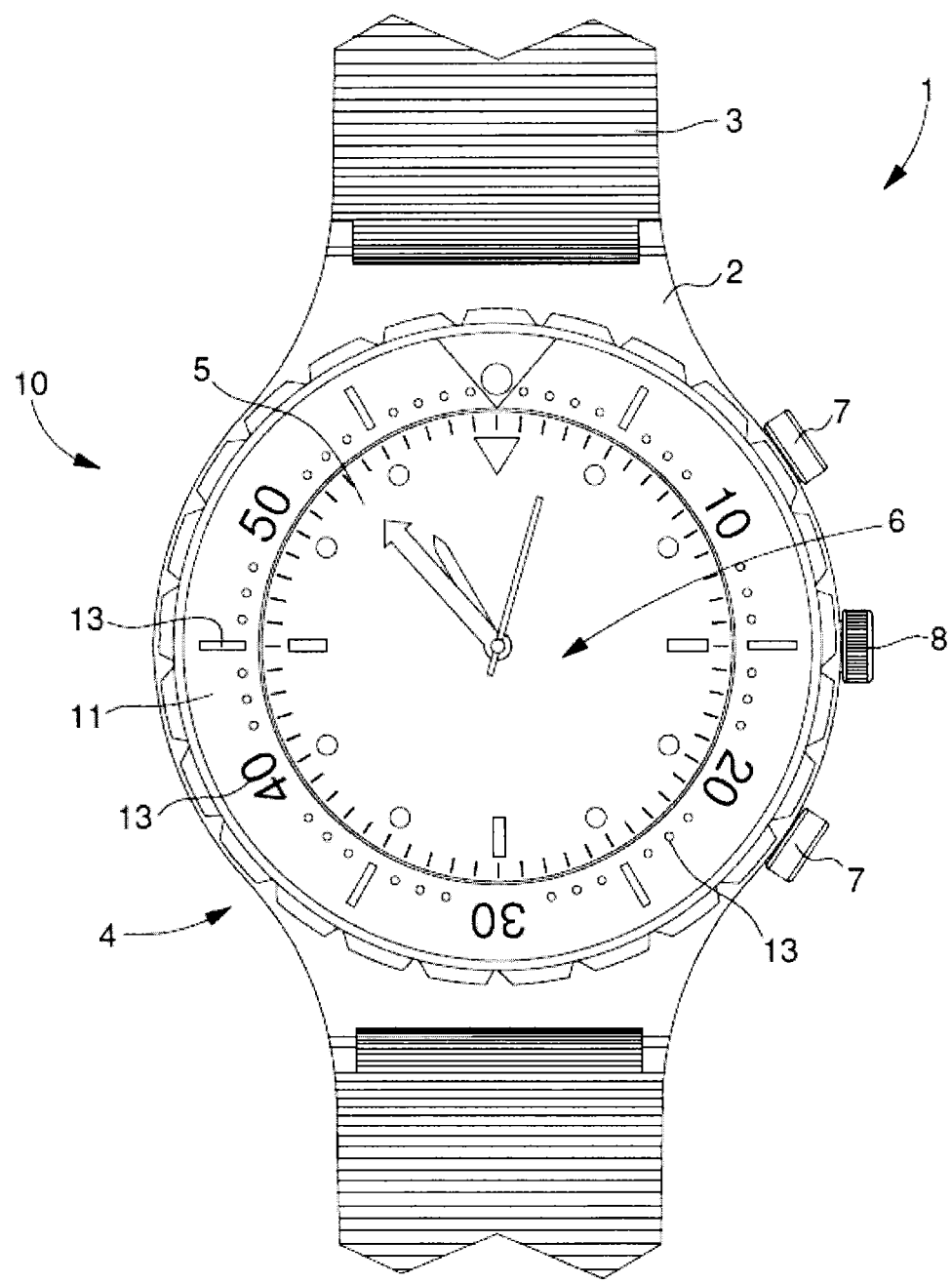
FIG. 1 is a diagram of a timepiece according to the invention.
Figure 2:
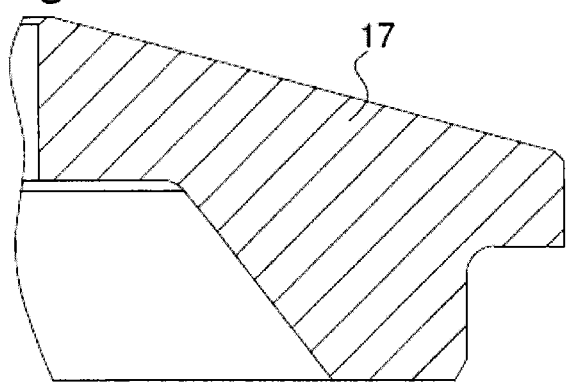
FIGS. 2 to 4 are successive steps of the manufacturing method according to the invention.
Figure 3:
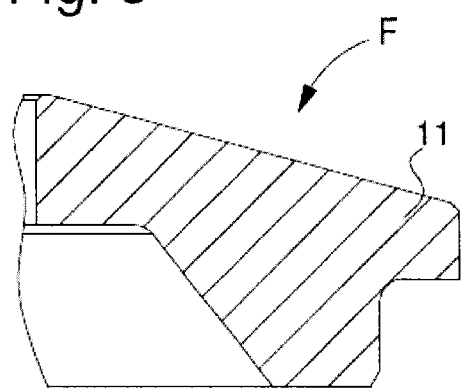

The example illustrated in FIG. 1 shows a timepiece, generally referenced 1, including at least one inlaid element 10. Each inlaid element 10 is intended to form a wear-resistant part including at least one composite ceramic decoration 13, such as, for example, a ceramic in an organic matrix, whose visual quality is improved, particularly in terms of contrast.

The inlaid element 10 according to the invention may form either all or part of the exterior of timepiece 1. Thus, it could form all or part of a case 2, a bracelet 3, a bezel 4, a dial 5, a crystal 6, a push button 7 and/or a crown 8. In the example illustrated below, the explanation of the invention will be given with reference to a ring 10 including inlaid decorations 13, forming the graduations of a bezel 4. It is also possible to form inlaid elements 10 for a timepiece movement such as, for example, a bridge and/or a plate and/or an oscillating weight.

Figure 5:
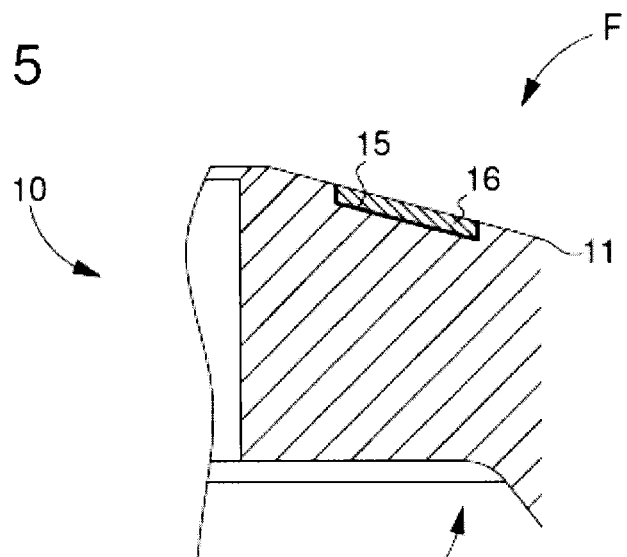
FIG. 5 is a partial view of an element obtained according to the invention.

As illustrated in FIGS. 1 and 5, inlaid ceramic element 10 includes a body 11 including at least one recess 12 forming the pattern cavity for a decoration 13. FIG. 1 shows that, advantageously according to the invention, each decoration 13 may take any form, such as, for example, a geometrical figure or an alphanumerical character. According to the invention, each recess 12 is completely filled with at least one composite ceramic 16. This configuration protects each decoration 13 in body 11.

As explained more clearly hereafter, according to the invention, composite ceramic 16 is obtained from an organic matrix comprising ceramic particles making it possible to obtain a large variety of materials of sufficient hardness to be polished at the same time as body 11.

According to the invention, body 11 is obtainable from a large variety of materials. Preferably, body 11 is made of ceramic. It may also be formed by a cermet, which is a material formed of a mixture of ceramic and metal. More generally, it is possible, by way of example, to use a carbide, an oxide or a nitride of materials such as titanium, silicon, aluminium or zirconium to form all or part of body 11.

In order to improve the adherence of decoration 13 in body 11, recess 12 has a depth of between 80 µm and 500 µm and preferably, substantially equal to 400 µm. It is thus understood that, preferably, recess 12 does not open onto the opposite face P.

Further, for reasons of adherence of composite ceramic 16, preferably, each bottom of said at least one recess 12 has a modified surface state in order to increase the contact surface thereof. As explained below, the increase in surface may be obtained, in particular, by forming cavities in said bottom of said at least one recess or by locally increasing the roughness thereof.

Finally, as seen in FIG. 5, optionally, a bonding layer 15, of between 2 µm and 150 µm, may be formed between the bottom of said at least one recess and composite ceramic 16, to ensure improved adherence of decoration 13. By way of example, bonding layer 15 may be formed from a printing technique so as to continuously cover the bottom of said at least one recess. This technique may consist, in particular, of pad printing, sputtering or application by roller or brush.

This layer 15 may include, in particular, a lacquer and/or a metal and/or a metallic alloy and/or a metallic nitride and/or a metallic carbide and/or a silane and/or a titanate and/or a zirconate and/or an aluminate. In a non-limiting manner, it was demonstrated, in particular, that a layer of chromium, of titanium or of chromium nitride improves the bonding between the ceramic of body 11 and composite ceramic 16.

Thus, according to the invention, the visual rendering of each decoration 13 is obtained through the colour of composite ceramic 16. Consequently, the material used for composite ceramic 16 will preferably be guided by its colour, or more generally, its aesthetic appearance. By way of example, it is therefore possible to obtain a highly contrasted visual rendering with a dark-coloured body 11 and decorations 13 in one (or more) light colour(s), while still having a "ceramic" appearance.

When the optional bonding layer 15 is used, its colour may also be selected or modified in order to modify the appearance of composite ceramic 16. Indeed, the thickness of composite ceramic 16 may, depending on the application, render the latter substantially translucent. Consequently, if an optional bonding layer 15 is used, its colour will be visible through composite ceramic 16. Thus, by way of example, a colour pigment or a selected material could be added to the composition of optional bonding layer 15 in order to modify the substantially translucent appearance of composite ceramic 16.

It is understood that decorations 13 may be formed using the same material to offer a homogeneous appearance, or several different materials in order, for example, to give a different colour to two decorations, such as a first colour for the indices and another colour for the alphanumerical characters in the case of FIG. 1.

In order to make the colours uniform, it is also possible to envisage forming decorations 13 in the same material as that surrounding body 11. One could thus, in an embodiment example of FIG. 1, have decorations 13 of bezel 4 in the same material as case 2, bracelet 3, the rest of bezel 4, dial 5, push buttons 7 and/or crown 8.

The method 21 of manufacturing an inlaid element 10 will now be explained with reference to FIGS. 2 to 6 using the example of a ceramic body 11.

Figure 6:
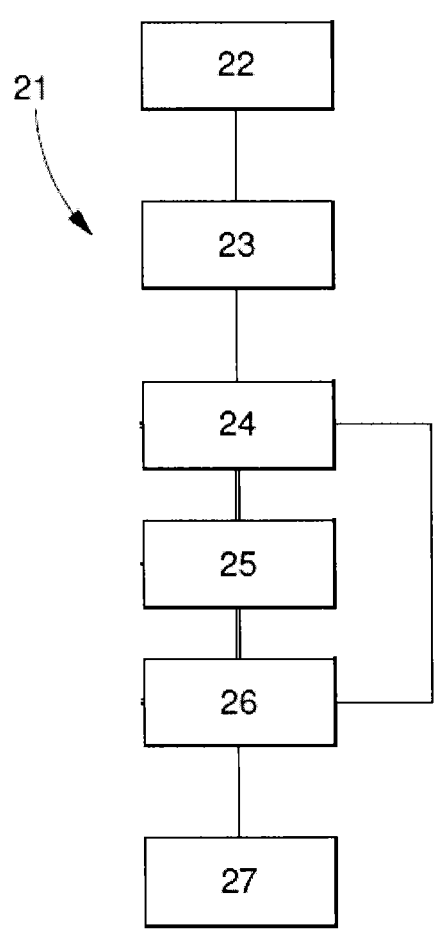
FIG. 6 is a flow diagram of the method according to the invention.

In a first step 22 illustrated in FIG. 6, method 21 consists in forming body 11, for example, of zirconia or alumina. As is partially shown by the change from FIG. 2 to FIG. 3, the final body 11 of step 22 is preferably obtained by sintering, i.e. from a green body 17 preformed via an injection and/or pressing process. At the end of step 22, the body 11 visible in FIG. 3 has its final dimensions. Of course, step 22 may be obtained other than by sintering.

Figure 4:
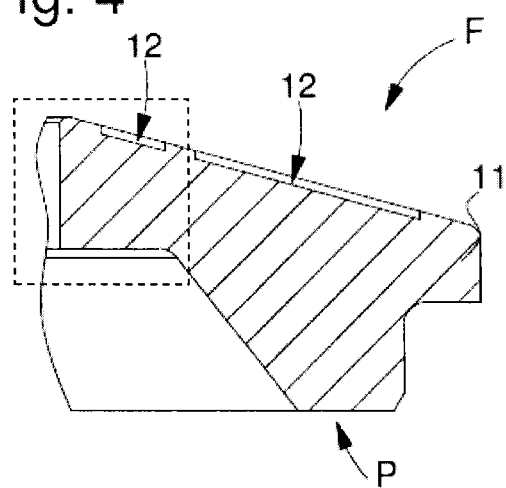

As illustrated in FIG. 6, method 21 includes a second step 23, intended to etch at least one blind recess 12, in one face F of ceramic body 11, with recesses 12 forming the pattern cavity for future decorations 13 as visible in FIG. 4. Preferably, each recess 12 has a depth of between 80 µm and 500 µm. Step 23 is preferably obtained by destructive radiation using a laser to obtain proper etching precision.

As illustrated in FIG. 6, method 21 continues with a third step 24 intended to change the surface state of the bottom of said at least one recess 12, so as to increase the contact surface thereof. Preferably, step 24 forms cavities in the bottom of said at least one recess or merely increases its local roughness.

The cavities or roughness may have depths which are preferably no more than one fifth of the depth of recesses 12, in order to ensure an increased contact surface. Step 24 is preferably obtained by destructive radiation using a laser, by sandblasting or by chemical etching.

By way of example, tests were performed using recesses 12 having a depth of 400 µm. The cavities were made by destructive radiation, forming a first series of substantially parallel, rectilinear grooves which intersects with a second series of substantially parallel, rectilinear grooves. The depth of the cavities was modulated between 10 and 50 µm and was found satisfactory each time with respect to the adherence of decoration 13 to body 11. Consequently, the cavities may form grooves running on said bottom of said at least one recess and all or part of the grooves may be secant.

Of course, it would also be possible to envisage roughly forming a hole in a mould followed by a laser finishing operation to obtain the same etching precision. The object is to improve adherence by an increase in surface, without, however, adversely affecting the wettability of the materials which have to fill the cavities and each recess.

In a first embodiment, seen in double lines in FIG. 6, step 24 is followed by step 25 of method 21, consisting in forming a bonding layer 15 on the bottom of said at least one recess, in order to ensure improved adherence of the future composite ceramic 16 formed in step 26. This first embodiment concerns the case where the material of decoration 13 is formed by composite ceramic 16 and, optionally, bonding layer 15, as seen in FIG. 5.

Step 25 may be formed by a liquid or paste deposition of a binder requiring subsequent activation using a heat and/or drying treatment. Such a bonding layer 15 may, for example, be formed from a silane or vinyl organosiloxane, alone or partially hydrolysed as well as one of its reaction products, from a silane or an organosiloxane, functionalized by an epoxy function alone or partially hydrolysed as well as one of its reaction products, from an amino functional silane or organosiloxane, alone or partially hydrolysed as well as one of the reaction products, of a silane or an organosiloxane, functionalized by an anhydride radical alone or partially hydrolysed as well as one of its reaction products, and/or a metal alkoxide or a metal chelate, such as titanium, zirconium, aluminium such as, for example, tert-butyl titanate. It is therefore also possible to envisage a lacquer, a metal, a metallic alloy, a metallic nitride, a metallic carbide, a silane, an organosiloxane, an alkanethiol, an alkane bisulfide, a zirconate, a titanate and/or an aluminate.

In the first embodiment, after step 25, method 21 continues with step 26.

In a second embodiment, seen in a single line in FIG. 6, step 24 is immediately followed by step 26. This second embodiment concerns the case where the material of decoration 13 is formed only by composite ceramic 16.

Step 26 consists in filling said at least one recess 12 with said a composite ceramic 16 in order to form said decoration. Preferably, step 26 includes phases i) and ii).

In a first phase i), method 21 consists in filling said at least one recess 12 with an organic matrix comprising ceramic particles. Method 21 continues with the second phase ii) intended to heat said matrix under a controlled atmosphere so as to crosslink and densify it. It is therefore clear that there is obtained a composite ceramic 16 whose hardness will be sufficient for it to be polished at the same time as body 11.

Preferably, the organic matrix used in step 26 is formed, for example, from a modified or unmodified epoxy resin, from a modified or unmodified acrylic, from a polyurethane or a silicone. Thus, depending on the nature of the matrix, the crosslinking may be initiated and/or performed and/or improved using electromagnetic radiation such as, for example, by ultraviolet (UV) radiation. By way of example, it is thus possible to use the commercial products E28311, E2840 sold by the Polymers Division of The Swatch Group Research and Development Ltd. Consequently, in light of these materials, phase ii) may be performed at a temperature of between 20 and 300° C. and at a pressure of between 1 and 6 bars.

Further, preferably according to the invention, the ceramic particles may be formed from a carbide, an oxide or a nitride of materials such as titanium, silicon, aluminium or zirconium to form all or part of decoration 13. It is thus understood that these particles may or may not be from the same family as that of body 11. Further, diamond particles may be added in addition to the ceramic particles.

As explained above, depending on the desired colour or more generally the desired visual rendering, the composite ceramic(s) 16 formed in step 26 preferably include(s) one or more colours contrasting with that of body 11.

Finally, in a last step 27, method 21 ends with the flattening of each composite ceramic 16 so as that it remains only in the hollow of each recess 12. Inlaid element 10 is thus finished and simply requires assembly in a final part. This step 27 can be obtained by a usual surfacing method such as grinding or lapping to remove any surplus material, followed by polishing.

Of course, this invention is not limited to the illustrated example but is capable of various variants and alterations that will appear to those skilled in the art. In particular, the application of inlaid element 10 according to the invention is in no way limited to a timepiece 1. Thus, inlaid element 10 could, by way of example, be applied to a piece of jewellery or even to tableware.

Further, it is also possible to envisage replacing the laser etching in step 23 and/or the laser etching, sandblasting or chemical etching of step 24 with another type of etching if the precision and reject rate thereof are acceptable.

Further, it is also possible to create decorations including several overlaid and/or adjacent composite ceramics. This type of embodiment may, for example, allow for a multi-coloured element. Thus, a first composite ceramic having a first colour may itself be etched, for example by laser, to form a second composite ceramic having a second colour. It is thus possible to obtain, within the actual decoration, two contrasting colours or one colour with a phosphorescent material such as Superluminova®.

Finally, it is also to be noted that body 11 should not be limited to a ceramic element but more generally to an element made of machinable hard material.

The invention claimed is:

1. A method of manufacturing an inlaid ceramic or cermet element for a timepiece or for a piece of jewellery comprising:
    forming a ceramic or cermet body;
    etching at least one recess in one face of the ceramic or cermet body, the at least one recess forming a pattern cavity for decoration;
    changing a surface state of a bottom of the at least one recess to increase contact surface thereof;
    filling the at least one recess with a composite ceramic to form the decoration;
    flattening the composite ceramic so that the composite ceramic remains only in a hollow of the at least one recess,
    wherein the filling includes:
    filling the at least one recess with an organic matrix comprising ceramic particles, and
    crosslinking and densifying the matrix under a controlled atmosphere to form the composite ceramic.

2. The method according to claim 1, wherein the forming is achieved by sintering.

3. The method according to claim 1, wherein the ceramic or cermet body includes a carbide, an oxide, or a nitride of materials or titanium, silicon, aluminium, or zirconium.

4. The method according to claim 1, wherein the etching is performed by laser.

5. The method according to claim 1, wherein each at least one recess has a depth between 80 µm and 500 µm to improve force of adherence.

6. The method according to claim 1, wherein the changing is performed by laser.

7. The method according to claim 1, wherein the changing forms cavities in the bottom of the at least one recess.

8. The method according to claim 7, wherein the cavities form grooves running on the bottom of the at least one recess.

9. The method according to claim 8, wherein the grooves running on the bottom of the at least one recess are secant.

10. The method according to claim 7, wherein the cavities have depths which are less than one fifth of the depth of the at least one recess.

11. The method according to claim 1, wherein the changing is performed by sandblasting.

12. The method according to claim 1, wherein the organic matrix is formed from a modified or unmodified epoxy resin and/or a modified or unmodified acrylic and/or a polyurethane and/or a silicone.

13. The method according to claim 1, wherein the ceramic particles are formed from a carbide, an oxide or a nitride respectively of titanium, of silicon, of aluminium, or of zirconium.

14. The method according to claim 1, wherein the cross-linking is performed at a temperature of between 20 and 300° C.

15. The method according to claim 1, wherein the cross-linking is performed at a pressure of between 1 and 6 bars.

16. The method according to claim 1, wherein prior to the filling, the method further comprising:
   forming a bonding layer on the bottom of the at least one recess to achieve improved adherence of the composite ceramic.

17. The method according to claim 16, wherein the bonding layer is formed from a lacquer.

18. The method according to claim 16, wherein the bonding layer is formed from a metal or from a metallic alloy.

19. The method according to claim 16, wherein the bonding layer is formed from a metallic nitride, a metallic carbide, a silane, an organosiloxane, an alkanethiol, an alkane disulfide, a zirconate, a titanate, and/or an aluminate.

20. The method according to claim 1, wherein, between the filling and the flattening, the method further comprising:
   etching at least a second recess in one face of the composite ceramic;
   changing the surface state of the bottom of the at least one second recess to increase contact surface thereof;
   filling the at least one second recess with a second composite ceramic formed of an organic matrix comprising ceramic particles to form the decoration with two composite ceramics.

* * * * *